United States Patent
Shibata et al.

(10) Patent No.: US 10,176,556 B2
(45) Date of Patent: Jan. 8, 2019

(54) DISPLAY CONTROL APPARATUS, DISPLAY CONTROL METHOD, AND NON-TRANSITORY COMPUTER READABLE MEDIUM

(71) Applicant: FUJI XEROX CO., LTD., Tokyo (JP)

(72) Inventors: Hirohito Shibata, Kanagawa (JP); Kentaro Takano, Kanagawa (JP); Kengo Omura, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 450 days.

(21) Appl. No.: 14/532,112

(22) Filed: Nov. 4, 2014

(65) Prior Publication Data
US 2015/0254809 A1  Sep. 10, 2015

(30) Foreign Application Priority Data
Mar. 10, 2014 (JP) .................... 2014-046033

(51) Int. Cl.
*G06T 3/60* (2006.01)

(52) U.S. Cl.
CPC ..................... *G06T 3/60* (2013.01)

(58) Field of Classification Search
CPC ............... G06T 3/60; G06T 2219/2016
See application file for complete search history.

(56) References Cited

U.S. PATENT DOCUMENTS

| | | | | |
|---|---|---|---|---|
| 2012/0318077 A1* | 12/2012 | Paca | ...... | G09B 11/00 73/865.4 |
| 2013/0006188 A1* | 1/2013 | Pommereau | ...... | A61M 5/178 604/189 |
| 2014/0009385 A1* | 1/2014 | Ku | ...... | G09G 5/32 345/156 |
| 2014/0085196 A1* | 3/2014 | Zucker | ...... | G06Q 30/0241 345/156 |
| 2014/0184628 A1* | 7/2014 | Lee | ...... | G06F 3/1423 345/545 |
| 2015/0022480 A1* | 1/2015 | Case | ...... | G06F 3/041 345/174 |

FOREIGN PATENT DOCUMENTS

| | | |
|---|---|---|
| JP | 2000-056878 A | 2/2000 |
| JP | 2000163179 A | 6/2000 |
| JP | 2013076924 A | 4/2013 |

OTHER PUBLICATIONS

Hirohito Shibata et al., "Orientation of a document that is easy to read or easy to write", Human Interface symposium 2013.
Notification of Reasons for Refusal dated Feb. 27, 2018 from the Japanese Patent Office in counterpart Japanese application No. 2014-046033.
Communication dated Dec. 12, 2017 from the Japanese Patent Office in counterpart Japanese application No. 2014-046033.

* cited by examiner

*Primary Examiner* — Phi Hoang
(74) *Attorney, Agent, or Firm* — Sughrue Mion, PLLC

(57) ABSTRACT

A display control apparatus includes an acquisition unit that acquires a document to be displayed on a display, a detector that detects at least one user present in a surrounding area of the display, and a display controller that controls a display angle of the document based on an orientation of the user with respect to the document displayed on the display.

13 Claims, 18 Drawing Sheets

DISPLAY CONTROL APPARATUS, DISPLAY CONTROL METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-046033 filed Mar. 10, 2014.

BACKGROUND

Technical Field

The present invention relates to a display control apparatus, a display control method, and a non-transitory computer readable medium.

SUMMARY

According to an aspect of the invention, there is provided a display control apparatus including an acquisition unit that acquires a document to be displayed on a display, a detector that detects at least one user present in a surrounding area of the display, and a display controller that controls a display angle of the document based on an orientation of the at least one user with respect to the document displayed on the display.

BRIEF DESCRIPTION OF THE DRAWINGS

Exemplary embodiments of the present invention will be described in detail based on the following figures, wherein.

DETAILED DESCRIPTION

Exemplary embodiments of the present invention are described below with reference to the drawings.

Figure 1:
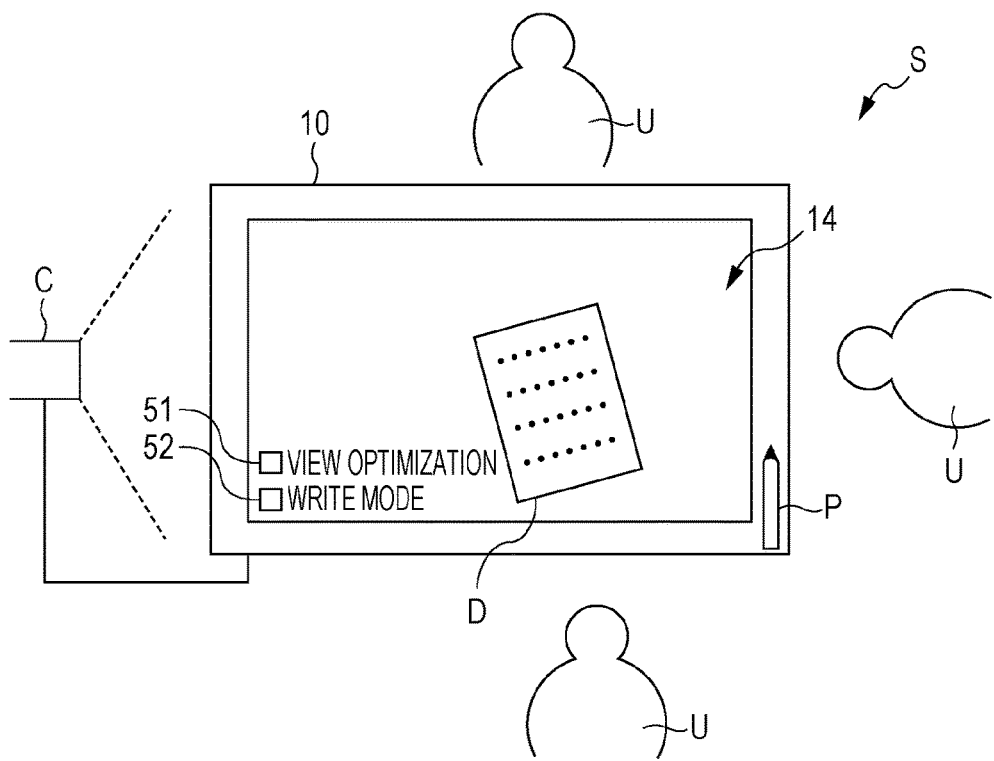
FIG. 1 illustrates a system configuration of an information processing system of an exemplary embodiment.

FIG. 1 illustrates a system configuration of an information processing system S of an exemplary embodiment. As illustrated in FIG. 1, the information processing system S includes a camera C and a document display apparatus 10. The document display apparatus 10 is connected to the camera C in a data communication enabled state.

The camera C is installed above the document display apparatus 10 (for example, right above the document display apparatus 10), and photographs an imaging area including the document display apparatus 10 and the surrounding area thereof. The camera C photographs the imaging area at predetermined time intervals, and outputs the captured image to the document display apparatus 10.

The document display apparatus 10 is a computer that includes a display 14, such as a liquid-crystal display, and displays a document D on the display 14. For example, the document display apparatus 10 is a table-top personal computer (PC). The document display apparatus 10 detects a user present in a surrounding area of the display 14 from the image captured by the camera C. The document display apparatus 10 controls an angle of (and a position of) the document to be displayed on the display 14 based on a positional relationship between the document to be displayed on the display 14 and the detected user.

In the exemplary embodiment, the display 14 in the document display apparatus 10 is a touchpanel, for example. A user may enter an operation input to the display 14 using a touchpen P (or a finger of a user, or a contactless stylus pen). The display 14 may display, in addition to the document D, process mode display boxes 51 and 52 configured to specify a process mode of the document. For example, the process modes may include a "view optimization mode" and a "write mode". In the view optimization mode, the display position and the display angle of the document D are changed in response to the position of a viewer so that the document D remains viewable with ease. In the write mode, the display position and the display angle of the document D are changed so that writing to the document D is easy when the user makes the writing on the document D using the touchpen P. Upon receiving information about a selected process mode from the user, the document display apparatus 10 controls the displaying of the document D in accordance with the selected process mode.

Described with reference to FIG. 2, and FIG. 3A through FIG. 3C are the position of the document (display position), the angle of the document (display angle), the orientation of the user, and the definition of an angle made between the user and the document.

Figure 2:
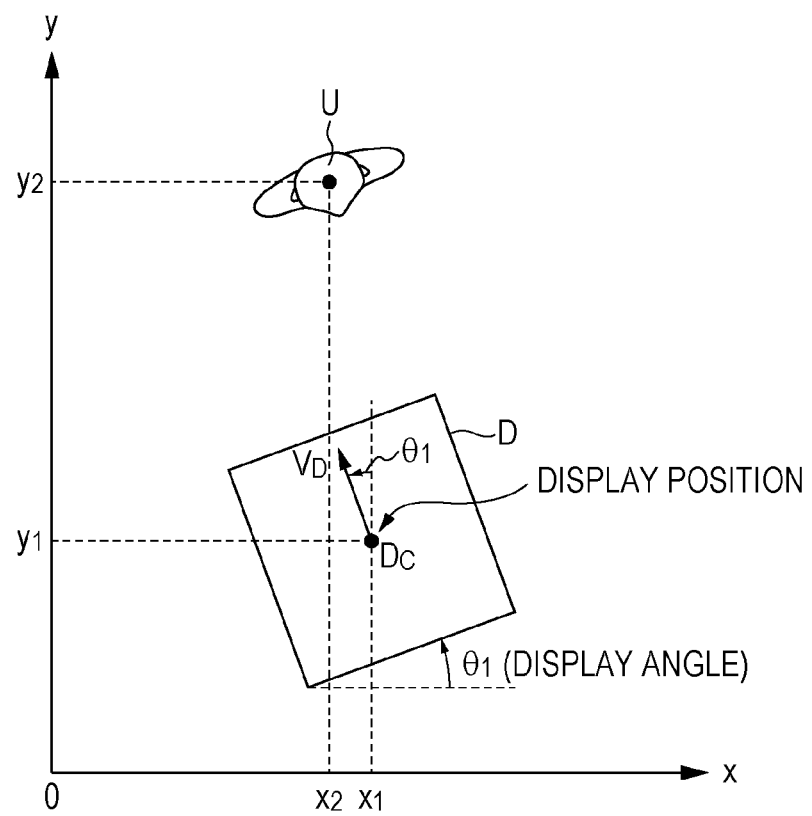
FIG. 2 illustrates a display coordinate system set up on a display.

FIG. 2 illustrates a display coordinate system set up on the display 14. An x-axis direction in FIG. 2 corresponds to the horizontal direction of the display 14, and a y-axis direction corresponds to the vertical direction of the display 14. The origin of the display coordinate system corresponds to one of the apexes of the display 14 (for example, the bottom-left apex of the display 14).

In the exemplary embodiment, coordinates (x1, y1) of the center point Dc of the document D are set to be the display position of the document D. A direction vector Vd of the document D representing the orientation of the document D is a vector directed from the center point Dc of the document D to the center point of the top side of the document D. An angle θ1 (display angle) of the document D in FIG. 2 is represented by an angle made between the Y axis and the direction vector Vd of the document D. The display angle θ1 is also represented as an angle made between the bottom side of the document D and the x axis. These two angles are geometrically identical to each other.

In the exemplary embodiment, the position of the user U is represented by coordinates (x2, y2) of one point in the region of the head of the user (such as the center of gravity) in the image region of the user U.

The definition of the angle made between the user U and the document D is described with reference to FIG. 3.

Figure 3A:
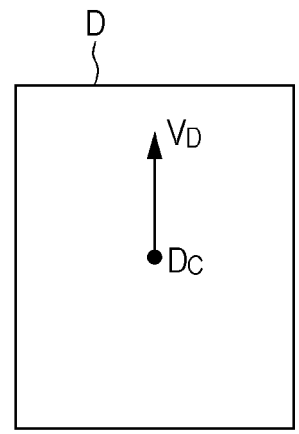
FIG. 3A through FIG. 3C illustrate the definition of an angle made between a user and a document.

FIG. 3A illustrates an example of a direction vector Vd of the document D representing the orientation of the document D and a direction vector Vu representing the orientation of the user U. Referring to FIG. 3A, the direction vector Vd of the user U originates at the nose (front end portion) in the head region representing the head of the user U, and extends in the direction of the center line of the head (median line extending from the parietal portion of the head and passing through the nose).

Figure 3B:
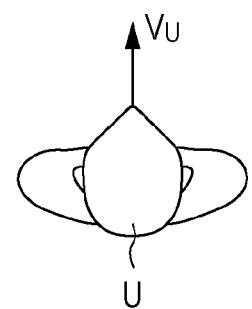

FIG. 3B illustrates an angle φ made between the user U and the document D. As illustrated in FIG. 3B, the angle made between the user U and the document D is represented as an angle of rotation that is involved to align the direction vector Vd of the user U with the direction vector Vd of the document D (to be in parallel in the same direction).

Figure 3C:
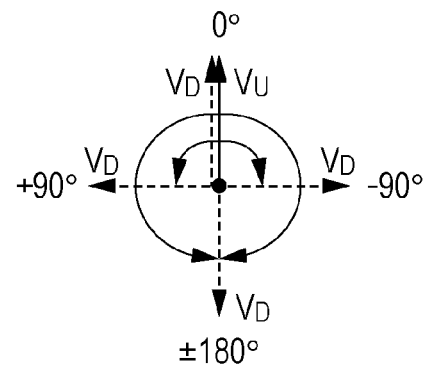

FIG. 3C illustrates a value that the angle φ between the user U and the document D may take. Referring to FIG. 3C, if the document D is tilted leftward with reference to the user U, the angle φ is set to be positive. If the document D is tilted rightward with reference to the user U, the angle φ is set to be negative. The angle φ falls within a range of −180 degrees≤angle φ≤+180 degrees.

Figure 4:
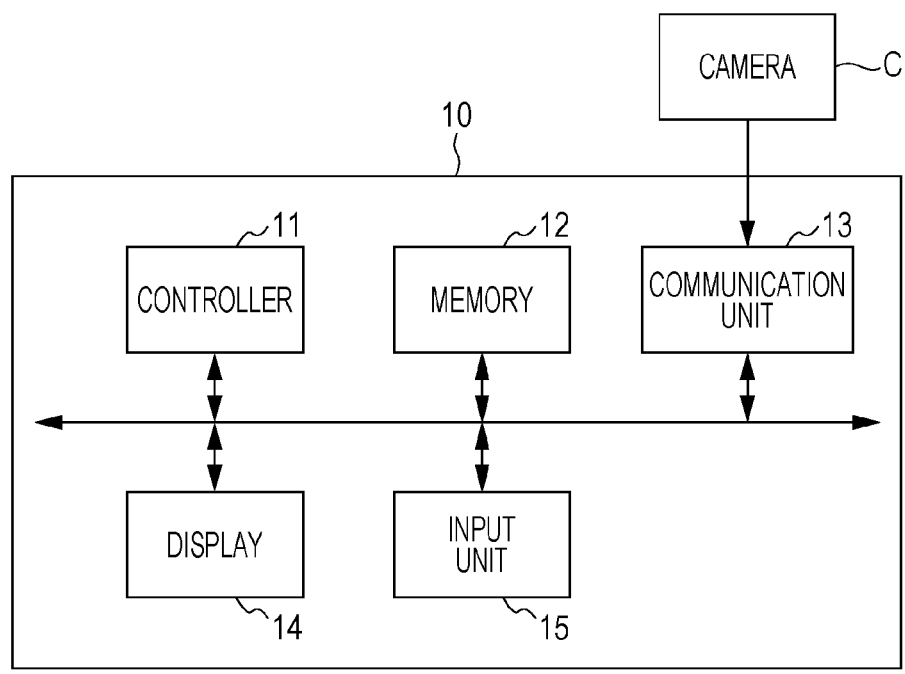
FIG. 4 illustrates a hardware configuration of a document display apparatus.

The hardware configuration of the document display apparatus 10 is described below with reference to FIG. 4. Referring to FIG. 4, the document display apparatus 10 includes a controller 11, a memory 12, a communication unit 13, a display 14, and an input unit 15.

The controller 11 includes a central processing unit (CPU), and performs a variety of arithmetic processes and controls elements within the document display apparatus 10 in accordance with a program stored on the memory 12.

The memory 12 stores a control program, such as an operating system of the document display apparatus 10, and data. The memory 12 also serves as a working memory of the controller 11.

The communication unit 13 includes interfaces, such as a network interface card (NIC), and a serial interface card, and communicates with the camera C via the interface. The communication unit 13 may communicate with another device via radio communication or via wired communication.

The display 14 is a display device, such as a liquid-crystal display, and displays a graphic image generated by the controller 11.

The input unit 15 receives an operational input from the user, for example. If the display 14 is a liquid-crystal display with a touchpanel function, the input unit 15 may be implemented by the touchpanel. The input unit 15 may include an input device, such as a keyboard or a mouse.

The function of the controller 11 in the document display apparatus 10 is described below with reference to FIG. 5 and FIG. 6. The function of the controller 11 is implemented by operating hardware of the document display apparatus 10 in accordance with the program stored on the memory 12 or a computer readable information storage medium. The program may be supplied to the document display apparatus 10 via an information storage medium, such as an optical disk, a magnetic disk, a magnetic tape, a magneto-optical disk, or a flash memory. The program may also be supplied to the document display apparatus 10 via a data communication network, such as the Internet.

Figure 5:
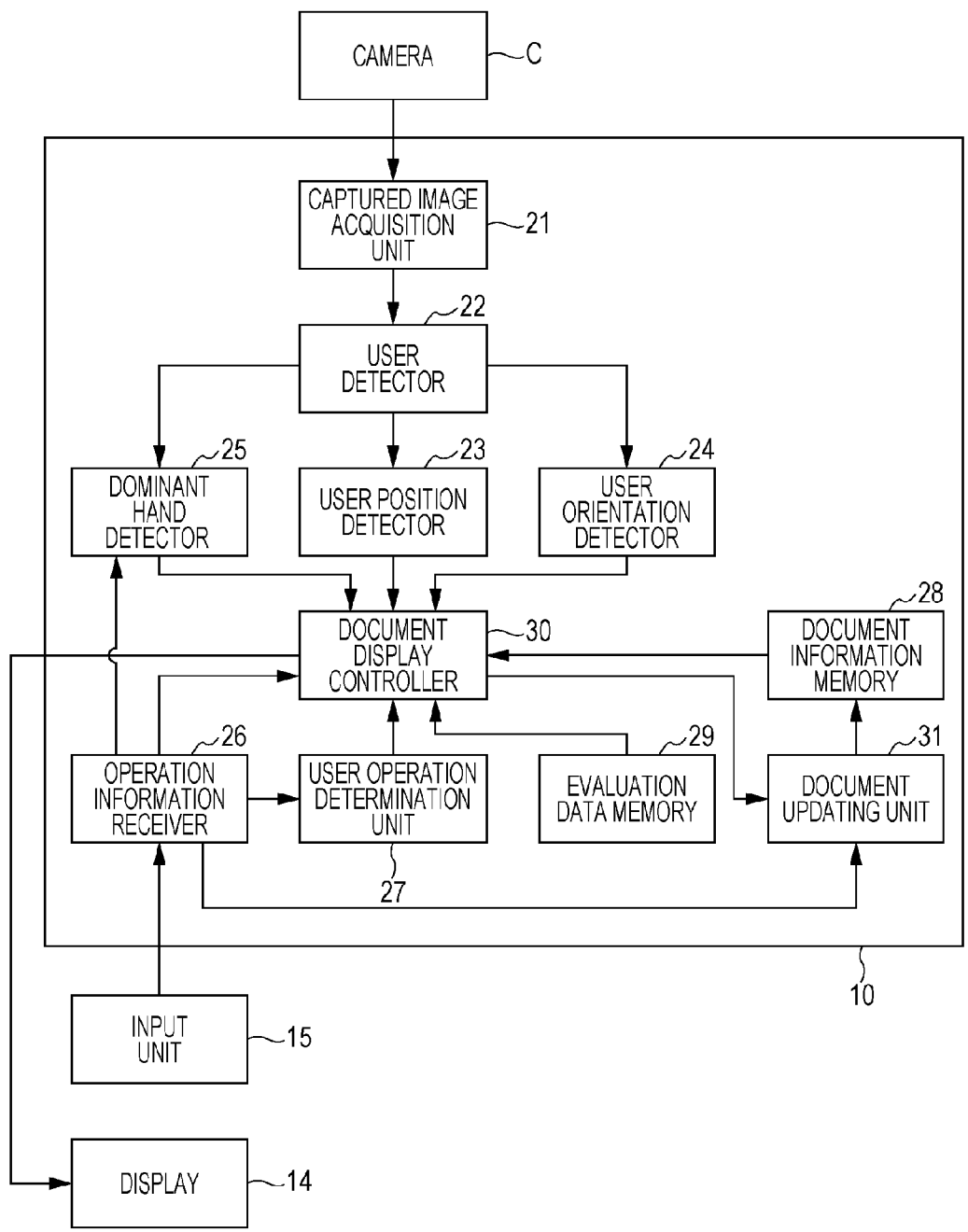
FIG. 5 is a functional block diagram illustrating an example of a function of the document display apparatus.

FIG. 5 is a functional block diagram illustrating an example of a function of the document display apparatus 10. Referring to FIG. 5, the document display apparatus 10 functionally includes a captured image acquisition unit 21, a user detector 22, a user position detector 23, a user orientation detector 24, a dominant hand detector 25, an operation information receiver 26, a user operation determination unit 27, a document information memory 28, an evaluation data memory 29, a document display controller 30, and a document updating unit 31. The functions of the elements within the document display apparatus 10 are described in detail below.

The captured image acquisition unit 21 acquires a captured image of an imaging area captured by the camera C and including the document display apparatus 10 and the surrounding area thereof. The captured image acquisition unit 21 successively acquires the image captured at predetermined time intervals.

The user detector 22 detects a user present in the surrounding area of the document display apparatus 10. For example, the user detector 22 may detect a user from the captured image acquired by the captured image acquisition unit 21. In this case, the user detector 22 may detect as a user a difference image region matching a shape pattern of the user, out of difference image regions between the captured image and a predetermined background image. In addition to the method through image processing, the user detector 22 may detect the user by acquiring a user ID of each user through radio communication from a device of the user or a radio frequency identifier (RFID) tag of the user.

The user position detector 23 detects the position of the user detected by the user detector 22. For example, the user position detector 23 detects position coordinates of the user in the coordinate system set up on the display 14 based on the position of the image region of the user in the captured image.

The user orientation detector 24 detects the orientation of the user detected by the user detector 22. For example, the user orientation detector 24 may detect the orientation of the user (the direction vector Vu of the user) in the coordinate system set up on the display 14 based on the shape of the image region of the user in the captured image. More specifically, the user orientation detector 24 detects, as the orientation of the user, a direction directed to the display 14, namely, the user's line of sight, from directions along which the center lines (meridian lines extending from the parietal portion of the head and passing through the nose) extend.

The dominant hand detector 25 detects the orientation of the user detected by the user detector 22. The dominant hand detector 25 may extract image regions corresponding to the left hand and the right hand in the image region of the user detected by the user detector 22, and may detect the user's dominant hand depending on which of the extracted image regions is used in the operation. If the identification (ID) of the user is obtained by the user detector 22, the user's dominant hand may be detected by acquiring dominant hand information predetermined for the user ID.

The operation information receiver 26 receives the operation information of the user. The operation information receiver 26 may acquire the operation information of the user, based on information input from the input unit 15 (a button operation, a touch operation, or the like), information transmitted from the touchpen P if the touchpen P has a communication function, or information obtained as a result of image processing on the captured image. The operation information receiver 26 may identify the image region of an operator performing the operation information from the captured image at the reception of the operation information, and may identify as the operator performing the operation information as the user corresponding to the identified image region.

The user operation determination unit 27 determines the job of the user based on the operation information of the user received by the operation information receiver 26. For example, if the operation information of the user indicates the selection of the process mode, the user operation determination unit 27 determines the job of the user based on the selected process mode (a writing job in the write mode, a reading job in a view optimization mode, or the like). Upon determining from the captured image that the user holds the touchpen P, or upon determining that the user touches a display region of the document displayed on the display 14 with the touchpen P, the user operation determination unit 27 determines that the user holding the touchpen P is going to perform a writing job. If the user touches the display region of the document on the display 14 without holding the touchpen P, the user operation determination unit 27 may determine that the user is going to perform a tracing and reading job.

The document information memory 28 stores the data of the document displayed on the display 14. The document may include format information related to a vertically written form or a horizontally written form. The document display apparatus 10 reads the data of the document stored on the document information memory 28 based on the operation information received from the user, and displays the data on the display 14.

The evaluation data memory 29 stores evaluation data. The evaluation data evaluates operability in which the user performs the job, based on the dominant hand of the user, the job, the format information of the document, and the angle made between the document displayed on the display 14 and the user. The evaluation data memory 29 may further store a positional relationship between the user and the document. The positional relationship provides operability in which the user performs the job and is based on the dominant hand of the user, the job, and the format information of the document. The evaluation data may be measured for each user, and then pre-stored. The evaluation data is specifically described with reference to FIG. 7 through FIG. 9.

Figure 7:
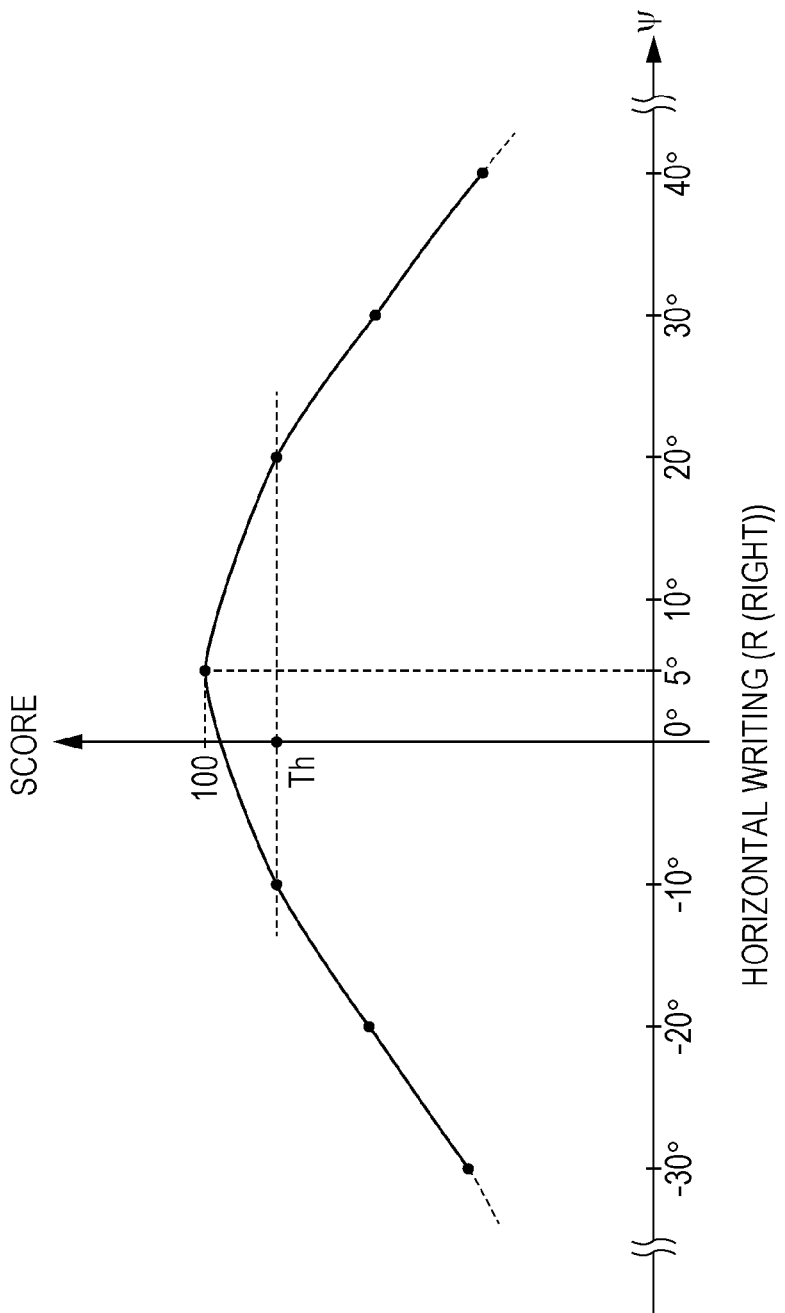
FIG. 7 illustrates an example of evaluation data.

FIG. 7 illustrates a score of operability with respect an angle θ made between the document and the user in a horizontally written document when a right-handed user performs a reading job. Referring to FIG. 7, the horizontal axis represents the angle θ and the vertical axis represents the score of operability. Scores, such as a reading speed of the user at an angle of θ (the number of characters/minute), may be normalized so that a maximum value thereof becomes 100. If a right-handed user performs a reading job on a horizontally written document as illustrated in FIG. 7, the user may perform the reading job easier within a range of angle between the user and the document from −10 degrees to +20 degrees (a range of angle having a score of a threshold value Th or higher). In particular, when the document is tilted leftward with respect to the user by 5 degrees, the user enjoys the highest score of operability. If the user is left-handed, the evaluation data is generally symmetrical with respect to the vertical axis.

Figure 8:
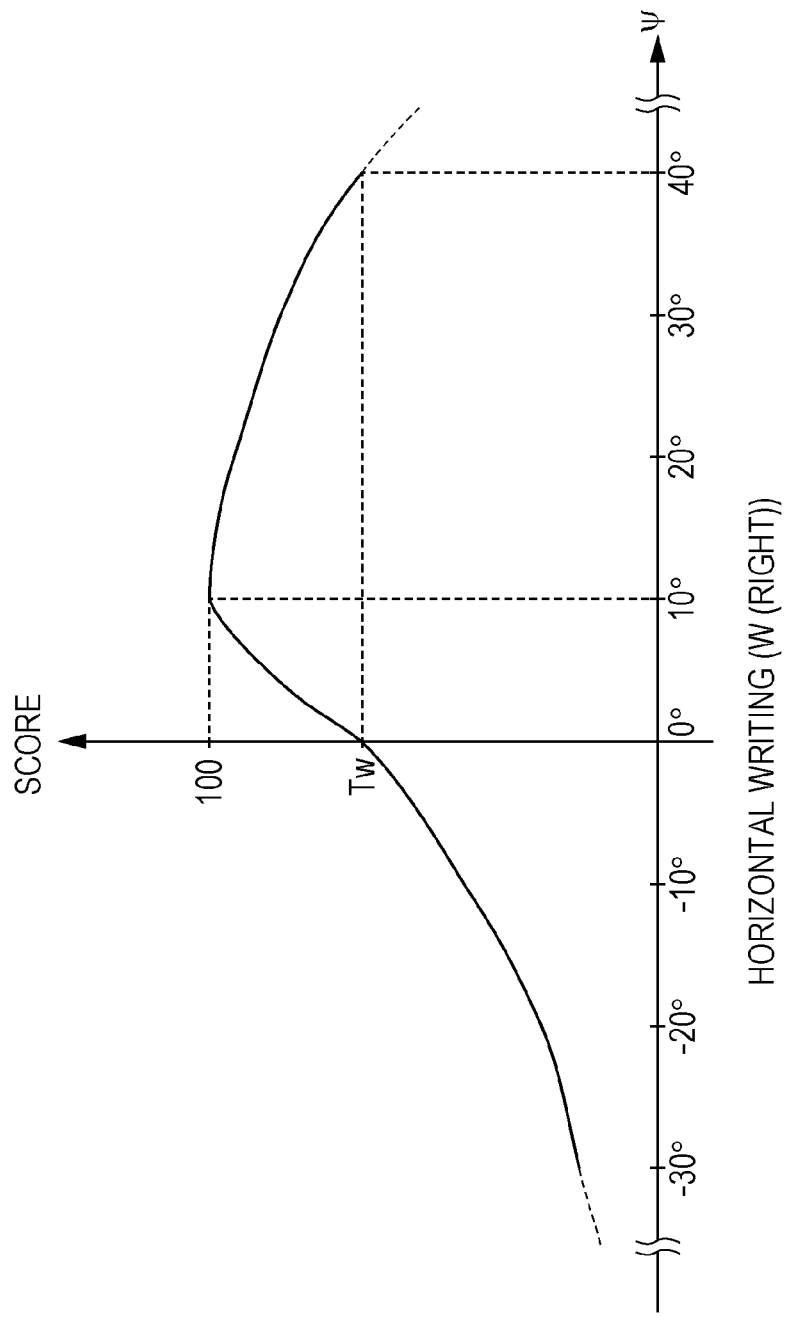
FIG. 8 illustrates an example of the evaluation data.

FIG. 8 illustrates a score of operability with respect an angle θ made between the document and the user in a horizontally written document when a right-handed user performs a writing job. As illustrated in FIG. 8, as well, the horizontal axis represents the angle θ and the vertical axis represents the score of operability. Scores, such as a writing speed of the user at an angle of θ (the number of characters/minute), may be normalized so that a maximum value thereof becomes 100. If a right-handed user performs a writing job on a horizontally written document as illustrated in FIG. 8, the user may perform the writing job easier within a range of angle between the user and document from 0 degrees to +40 degrees (a range of angle having a score of a threshold value Th or higher). In particular, when the document is tilted leftward with respect to the user by 10 degrees, the user enjoys the highest score of operability. If the user is left-handed, the evaluation data is generally symmetrical with respect to the vertical axis.

Figure 9:
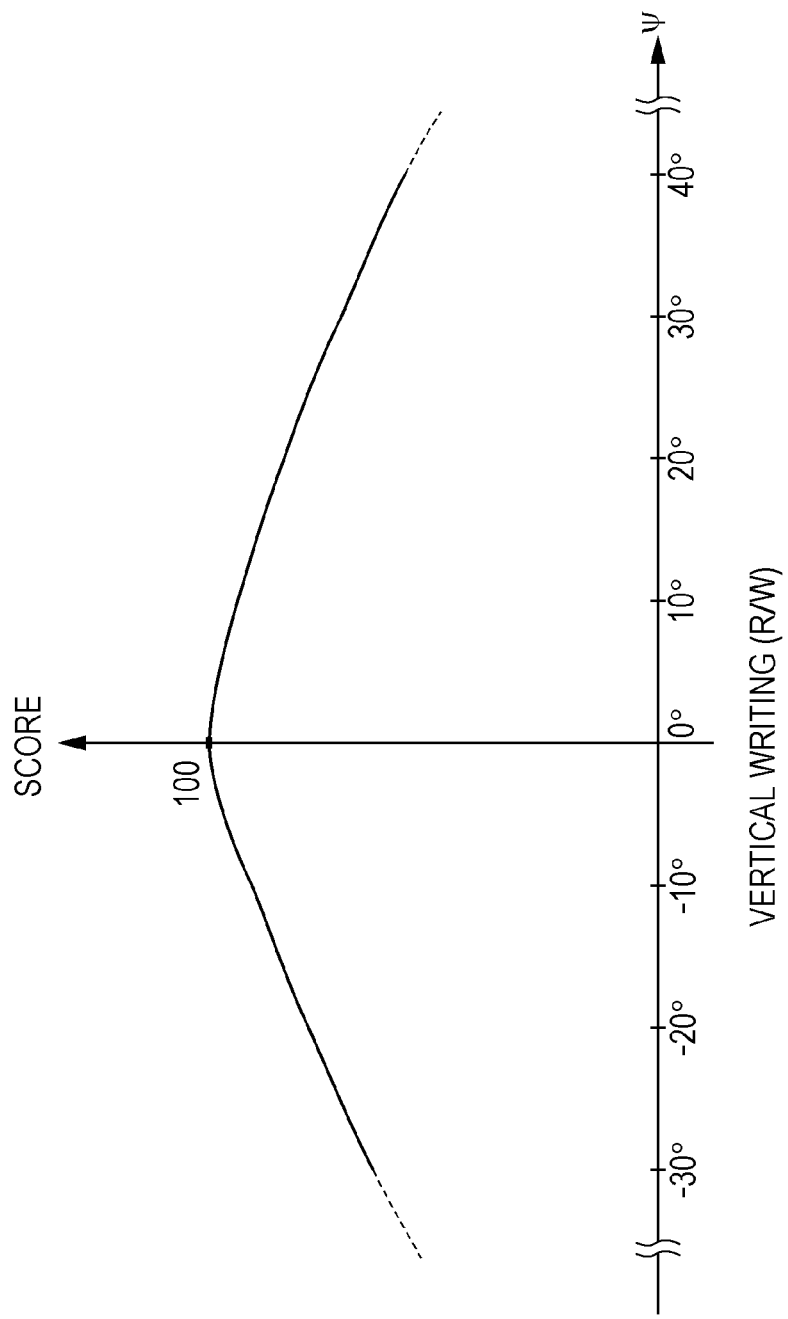
FIG. 9 illustrates an example of the evaluation data.

FIG. 9 illustrates a score of operability with respect an angle θ made between the document and the user in a vertically written document when a user (regardless of whether the user is right-handed or left-handed) performs a reading/writing job. As illustrated in FIG. 9, as well, the horizontal axis represents the angle θ and the vertical axis represents the score of operability. Scores may be normalized so that a maximum value thereof becomes 100. Scores are a reading speed of the user at an angle of θ (the number of characters/minute), a writing speed of the user at an angle of θ (the number of characters/minute), or a combination thereof. Referring to FIG. 9, the highest score is achieved in operability at an angle of zero between the user and the document if the document is vertically written, regardless of the dominant hand, or regardless of the reading job or the writing job (a range of angle having a score of a threshold value Th or higher). The evaluation data is generally laterally symmetrical with respect to the zero degree.

The evaluation data has been described for exemplary purposes only. The exemplary embodiment is not limited to the evaluation data described herein. The evaluation data may be presented in a formula (function) or a table representing the relationship between the angle φ and the score. The evaluation data may be further subdivided into a reading job, a trace and reading job (a reading job while touching the display 14 with the finger), and a writing job, and the evaluation data is set up for each of these subdivided jobs.

The document display controller 30 controls the display position and the display angle of the document in order to display the document on the display 14. The document display controller 30 controls the display position and the display angle based on the position of the user detected by the user position detector 23, the orientation of the user detected by the user orientation detector 24, the dominant hand of the user detected by the dominant hand detector 25, and the job of the user determined by the user operation determination unit 27, and the format information of the document. The process of the document display controller 30 is described in detail below.

The document updating unit 31 updates the data of the document based on writing information received from the user if the user has performed a writing job on the document displayed on the display 14. For example, if the user operation determination unit 27 determines that the user is going to perform a writing job, the document updating unit 31 may update the data of the document based on the operation information received from the operation information receiver 26. The document updating unit 31 stores the updated data of the document on the document information memory 28.

Figure 6:
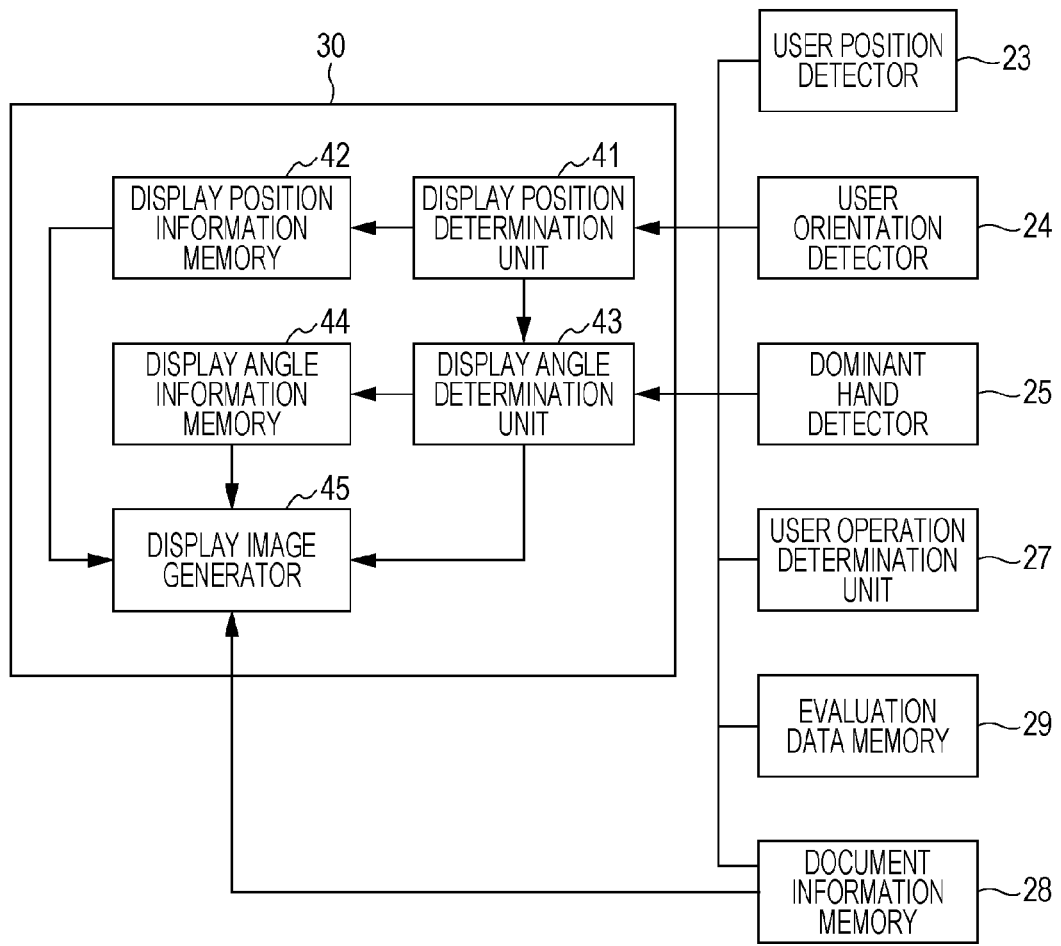
FIG. 6 is a functional block diagram illustrating a function of a document display controller.

A document display control process of the document display controller 30 is described in detail in accordance with a functional block diagram of the function of the document display controller 30 illustrated in FIG. 6. Referring to FIG. 6, the document display controller 30 includes a display position determination unit 41, a display position information memory 42, a display angle determination unit 43, a display angle information memory 44, and a display image generator 45. These elements are describe in detail below.

The display position determination unit 41 determines the display position of the document based on the position of the user detected by the user position detector 23, the orientation of the user detected by the user orientation detector 24, the dominant hand of the user detected by the dominant hand detector 25, and the job of the user determined by the user operation determination unit 27. A specific example of the determination process of the display position of the document is described below.

If only a single user is detected, the display position determination unit 41 aligns a position, spaced ahead of the user by a predetermined distance ($L_1$) in the orientation of the user from the position of the user, with the bottom side of the document, and translates the document by a predetermined distance ($L_2$) in a direction that keeps the bottom side of the document vertical to the orientation of the user. The resulting position of the document may be the display position. If the user is right-handed, $L_2$ is positive in the right direction from the user, and if the user is left-handed, $L_2$ is positive in the left direction from the user. This is because a right-handed user tends to perform a writing job while moving the document horizontally in a rightward direction, and because a left-handed user tends to perform a writing job while moving the document horizontally in a leftward direction.

Multiple users may be detected and one of the users may perform a writing job (writing user). The display position determination unit 41 aligns a position, spaced ahead of the user by a predetermined distance ($L_1$) in the orientation of the writing user from the position of the writing user, with the bottom side of the document, and translates the document by a predetermined distance ($L_2$) in a direction that keeps the bottom side of the document vertical to the orientation of the writing user. The resulting position of the document may be the display position. If the user is right-handed, $L_2$ is positive in the right direction from the user, and if the user is left-handed, $L_2$ is positive in the left direction from the user.

Even if multiple users are detected, no writing user may be present among the detected multiple users. In such a case, the display position determination unit 41 determines the center position of the multiple users (or the center of gravity of the multiple users) to be the display position of the document.

The display position information memory 42 stores the display position determined by the display position determination unit 41. For example, the display position information memory 42 may successively overwrite an old display position with the latest display position determined by the display position determination unit 41.

The display angle determination unit 43 determines the display angle of the document based on the position of the user detected by the user position detector 23, the orientation of the user detected by the user orientation detector 24, the dominant hand of the user detected by the dominant hand detector 25, the job of the user determined by the user operation determination unit 27, the formant information of the document, and the evaluation data stored on the evaluation data memory 29. A specific determination process of the display angle of the document is described below.

The display angle determination unit 43 reads from the evaluation data memory 29 evaluation data $VD_i$ of a user $U_i$ detected by the user detector 22 (i=1, ..., and N where N is the number of users) based on the job of the user $U_i$, the dominant hand of the user, and the format information of the document. The display angle determination unit 43 then generates a evaluation function $F_i(\phi_i)$ of the angle $\phi_i$ made between the user $U_i$ and the document D for each user $U_i$ detected by the user detector 22 in accordance with the evaluation data $VD_i$. Let $X_i$ represent an angle of a direction vector of the user $U_i$ (an angle of the user $U_i$ with respect to the y axis), and let $\theta$ represent an angle of a document direction vector of the document D (the display angle or an angle of the document D with respect to the y axis), and the relationship $\phi_i = \theta - X_i$ holds. The display angle determination unit 43 generates a total evaluation function $TF(\theta)$ as the sum of $F_1(\theta - X_1)$, ..., and $F_N(\theta - X_N)$. Using a weight $w_i$ (i=1, ... N) represented by a real number equal to or above zero, the total evaluation function $TF(\theta)$ may be determined as $TF(\theta) = w_1 \cdot F_1(\theta - X_1) + \ldots + w_N \cdot F_N(\theta - X_N)$. In this case, weights may be determined based on the job of the user. The display angle $\theta$ that maximizes the score of $TF(\theta)$ is thus determined.

The display angle determination unit 43 sums, as the score of the display angle $\theta_j$, the evaluation functions $F_i(\phi_i)$ of the users based on the angle $\phi_i$ made between the user $U_i$ and the document D at the display angle $\theta_j = 360 \cdot j/M$ (j=0, ... M where M is an integer equal to or above 2), and determines a maximum one of the scores $\theta_j$ as the display angle $\theta$. This is interpreted that $TF(\theta)$ is calculated in steps of 360/M degrees, and the display angle having a maximum score is adopted as an appropriate display angle to the multiple users.

The direction vector of the user $U_i$ may be a vector originating at the position of the user $U_i$ and extending to the display position of the document D determined by the display position determination unit 41, or may be a direction vector detected for the user $U_i$ by the user orientation detector 24.

The display angle determination unit 43 may determine at least one user from among the users $U_i$ (i=1, ..., N where N is the number of detected users), (for example, a writing user), and may determine, as the display angle, $\theta$ that maximizes the total evaluation function $TF(\theta)$ within a range of an angle $\phi_k$ made between a determined user $U_k$ and the document D (for example, −10 degrees to +20 degrees in the reading job or 0 degree to +40 degrees in the writing job).

The display angle information memory 44 stores the display angle determined by the display angle determination unit 43. For example, the memory 12 successively overwrites an older display angle with the latest display angle determined by the display angle determination unit 43.

The display image generator 45 generates an image of the document based on the data of the document stored on the document information memory 28, the latest display position stored on the display position information memory 42, and the latest display angle stored on the memory 12. The document display controller 30 causes the display 14 to display a display screen including the image of the document generated by the display image generator 45.

A specific example of the document display control process is described with reference to FIG. 10 through FIG. 15.

Figure 10:
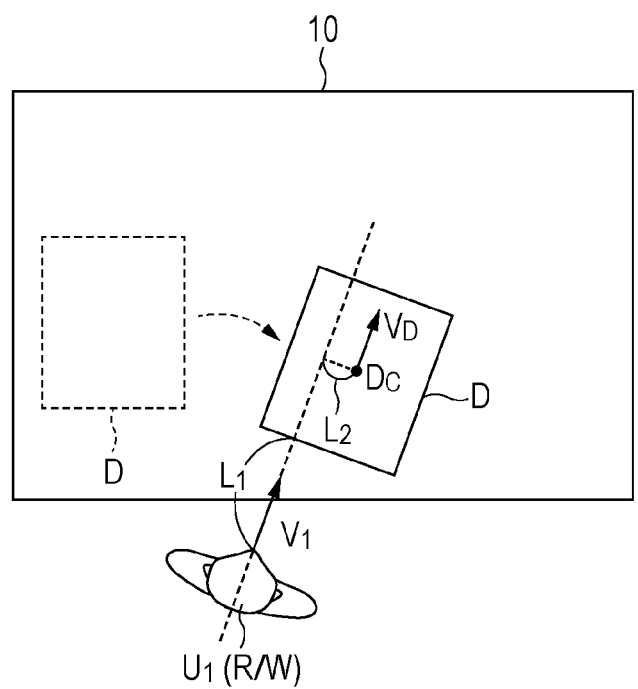
FIG. 10 illustrates an example of a display position of a document that is changed in a document display control process.

FIG. 10 and FIG. 11 illustrate the document display control process that is to be executed if only a single user is detected.

FIG. 10 illustrates an example of the display position of the document that is changed in accordance with the position and orientation of the user $U_1$. Referring to FIG. 10, the user $U_1$ may now perform a reading job (R) or a writing job (W). The document display apparatus 10 places the document D with the bottom side thereof at a position apart from the origin of the direction vector $V_1$ of the user $U_1$ by a distance $L_1$ so that a direction vector $V_D$ of the document D is parallel with the direction vector $V_1$ of the user $U_1$. Depending on the dominant hand of the user $U_1$, the document display apparatus 10 translates the document D in the direction of the dominant hand with respect to a line extended from the direction vector $V_1$ (rightward if the user is right-handed or leftward if the user is left-handed) so that the center Dc of the document D is spaced from the line extending from the direction vector $V_1$ by a distance $L_2$. The display position of the document D is thus determined. $L_1$ and $L_2$ may be predetermined values. $L_2$ may be zero, for example.

Figure 11A:
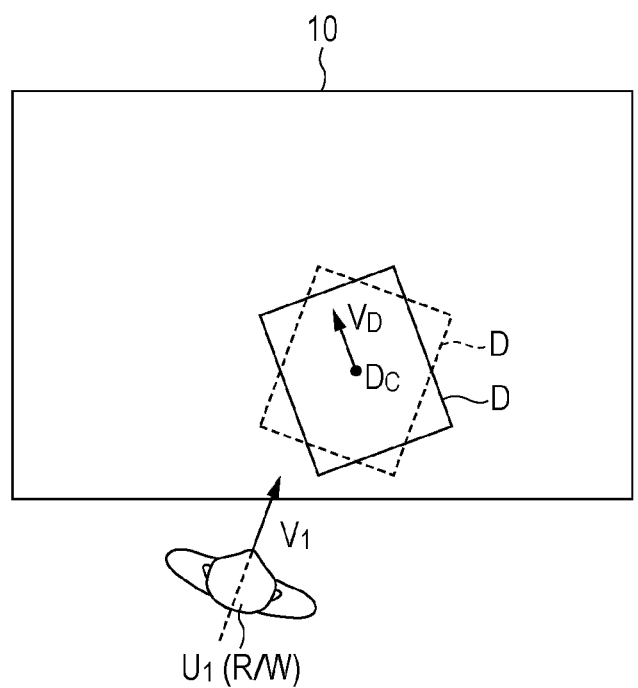
FIG. 11A and FIG. 11B illustrate an example of a display angle of the document changed in the document display control process.
Figure 11B:
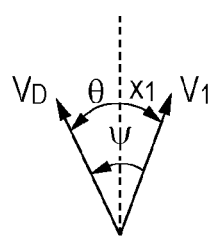

FIG. 11A and FIG. 11B illustrate an example of the display angle of the document determined in accordance with the orientation of the user $U_1$. As illustrated in FIG. 11A, the direction vector $V_D$ of the document D, which is in parallel with the direction vector $V_1$ of the user $U_1$, is rotated about the center Dc of the document D. After the rotation as illustrated in FIG. 11B, the direction vector $V_D$ of the document D has an angle $\theta$ (the display angle represented by an angle with respect to the y axis), and the direction vector $V_1$ of the user $U_1$ has an angle $X_1$ (represented by an angle with respect to the y axis). The angle $\phi$ made between the user $U_1$ and the document D is $\phi = \theta - X_1$. The evaluation data is determined in view of the dominant hand of the user $U_1$, the job, and the format information of the document, and an optimum angle $\phi$ is determined from the devaluation data having a maximum score.

Figure 12:
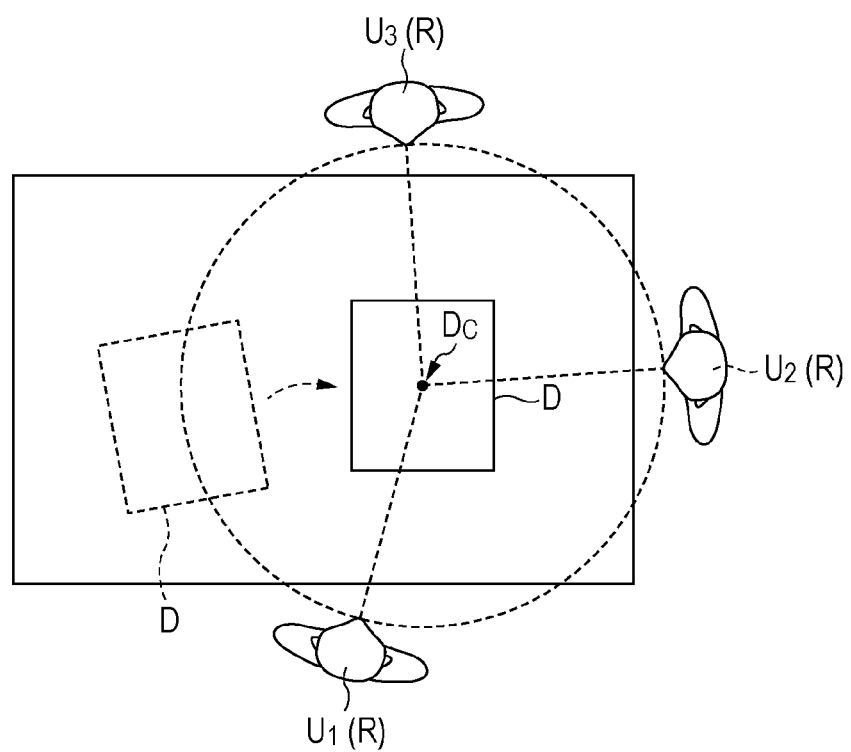
FIG. 12 illustrates an example of a display position of the document changed in the document display control process.
Figure 13A:
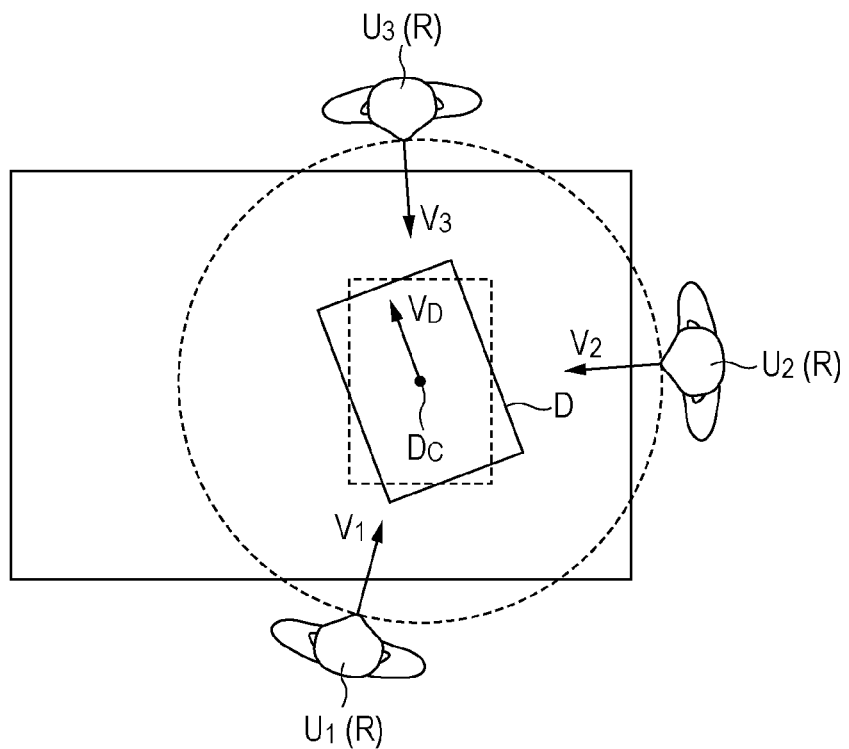
FIG. 13A and FIG. 13B illustrate an example of the display angle of the document changed in the document display control process.
Figure 13B:
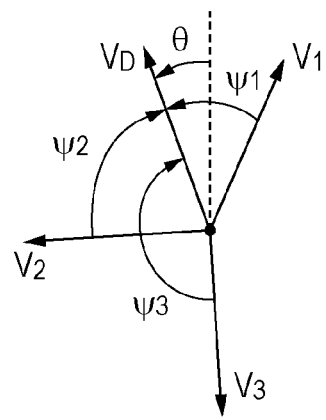

FIG. 12, and FIG. 13A and FIG. 13B describe the document display control process that is to be executed if no writing user is found among detected multiple users.

FIG. 12 illustrates an example of the display position of the document determined in accordance with the positions and orientations of users $U_1$, $U_2$, and $U_3$. If it is determined that the users $U_1$, $U_2$, and $U_3$ perform the reading job (R) as illustrated in FIG. 12, the document display apparatus 10 determines the display position so that the center Dc of the document D is arranged at the center of the users $U_1$, $U_2$, and $U_3$.

FIG. 13A and FIG. 13B illustrate an example of the display angle of the document determined in accordance with the orientations of the users $U_1$, $U_2$, and $U_3$. With the direction vector of the user $U_1$ designated $V_1$, the direction vector of the user $U_2$ designated $V_2$, the direction vector of the $U_3$ designated $V_3$, and the direction vector of the document D designated $V_D$, the direction vector $V_D$ of the document D is rotated about the center Dc of the document D. With the document D rotated as illustrated in FIG. 13B, the direction vector $V_D$ of the document D has an angle $\theta$ (the display angle represented by an angle with respect to the y axis), and the direction vector $V_i$ of the user $U_i$ (i=1, 2, or 3) has an angle $X_i$ (represented by an angle with respect to the y axis). The angle $\phi$ made between the user $U_i$ and the document D is $\phi_i = \theta - X_i$. Let $F_i$ represent the evaluation data that is determined in view of the dominant hand of the user $U_i$, the job, and the format information of the document, and let $w_i$ represent a weight (i is an integer equal to zero or above), and the total evaluation function $TF(\theta) = w_1 \cdot F_1(\theta - X_1) + w_2 \cdot F_2(\theta - X_2) + w_3 \cdot F_3(\theta - X_3)$. The document display apparatus 10 determines $\theta$ having a maximum value of $TF(\theta)$ as the display angle.

The document display control process that is performed with a writing user present among the multiple users is described with reference to FIG. 14, FIG. 15A and FIG. 15B.

Figure 14:
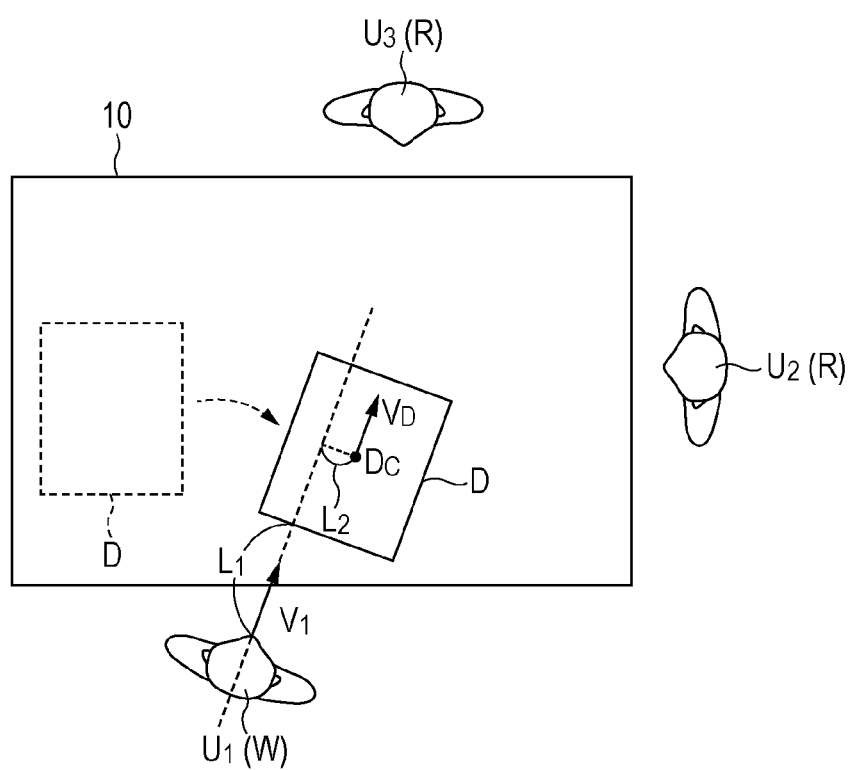
FIG. 14 illustrates an example of the display position of the document changed in the document display control process.

FIG. 14 illustrates the display position of the document determined when the user $U_1$ performs a writing job (W), and the users $U_2$ and $U_3$ perform a reading job (R). If the user $U_1$ performs the writing job (W), the document display apparatus 10 places the document D with the bottom side thereof at a position apart from the origin of the direction vector $V_1$ of the user $U_1$ by a distance $L_1$ in the direction vector $V_1$ of the user $U_1$ so that a direction vector $V_D$ of the document D is parallel with the direction vector $V_1$ of the user $U_1$. Depending on the dominant hand of the user $U_1$, the document display apparatus 10 translates the document D in the direction of the dominant hand with respect to a line extended from the direction vector $V_1$ (rightward if the user is right-handed or leftward if the user is left-handed) so that the center Dc of the document D is spaced from the line extending from the direction vector $V_1$ by a distance $L_2$. The display position of the document D is thus determined. $L_1$ and $L_2$ may be predetermined values. $L_2$ may be zero, for example.

Figure 15A:
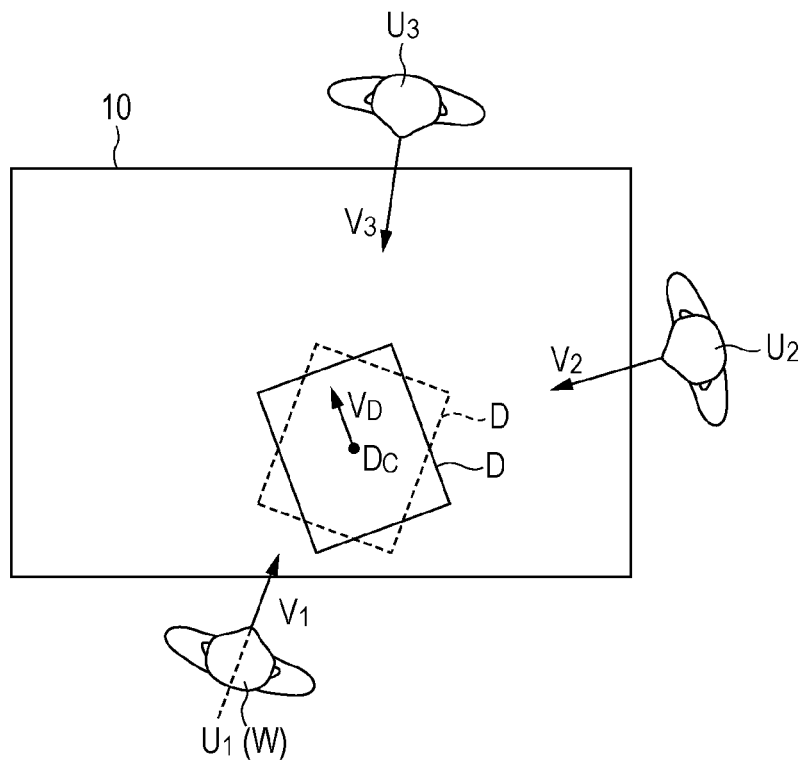
FIG. 15A and FIG. 15B illustrate an example of the display angle of the document changed in the document display control process.
Figure 15B:
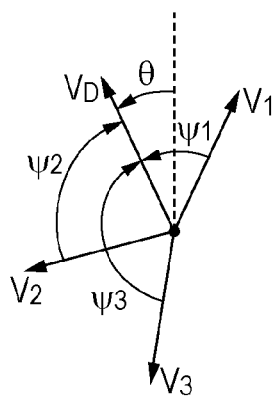

FIG. 15A and FIG. 15B illustrate an example of the display angle of the document determined in accordance with the orientations of the users $U_1$, $U_2$, and $U_3$. With the direction vector of the user $U_1$ designated $V_1$, the direction vector of the user $U_2$ designated $V_2$, the direction vector of the $U_3$ designated $V_3$, and the direction vector of the document D designated $V_D$, the direction vector $V_D$ of the document D is rotated about the center Dc of the document D as illustrated in FIG. 15A. As illustrated in FIG. 15B, the direction vector $V_D$ of the document D has an angle $\theta$ (the display angle represented by an angle with respect to the y axis), and the direction vector $V_i$ of the user $U_i$ (i=1, 2, or 3) has an angle $X_i$ (represented by an angle with respect to the y axis). The angle $\theta$ made between the user $U_i$ and the document D is $\phi_i = \theta - X_i$. Let $F_i$ represent the evaluation data that is determined in view of the dominant hand of the user $U_i$, the job, and the format information of the document, and let $w_i$ represent a weight (i is an integer equal to zero or above), and the total evaluation function $TF(\theta) = w_1 \cdot F_1(\theta - X_1) + w_2 \cdot F_2(\theta - X_2) + w_3 \cdot F_3(\theta - X_3)$. The document display apparatus 10 determines $\theta$ having a maximum value of $TF(\theta)$ as the display angle.

An example of the process performed by the document display apparatus 10 is described with reference to FIG. 16 through FIG. 18.

The entire flow of the document display control process performed by the document display apparatus 10 is described with reference to FIG. 16.

Figure 16:
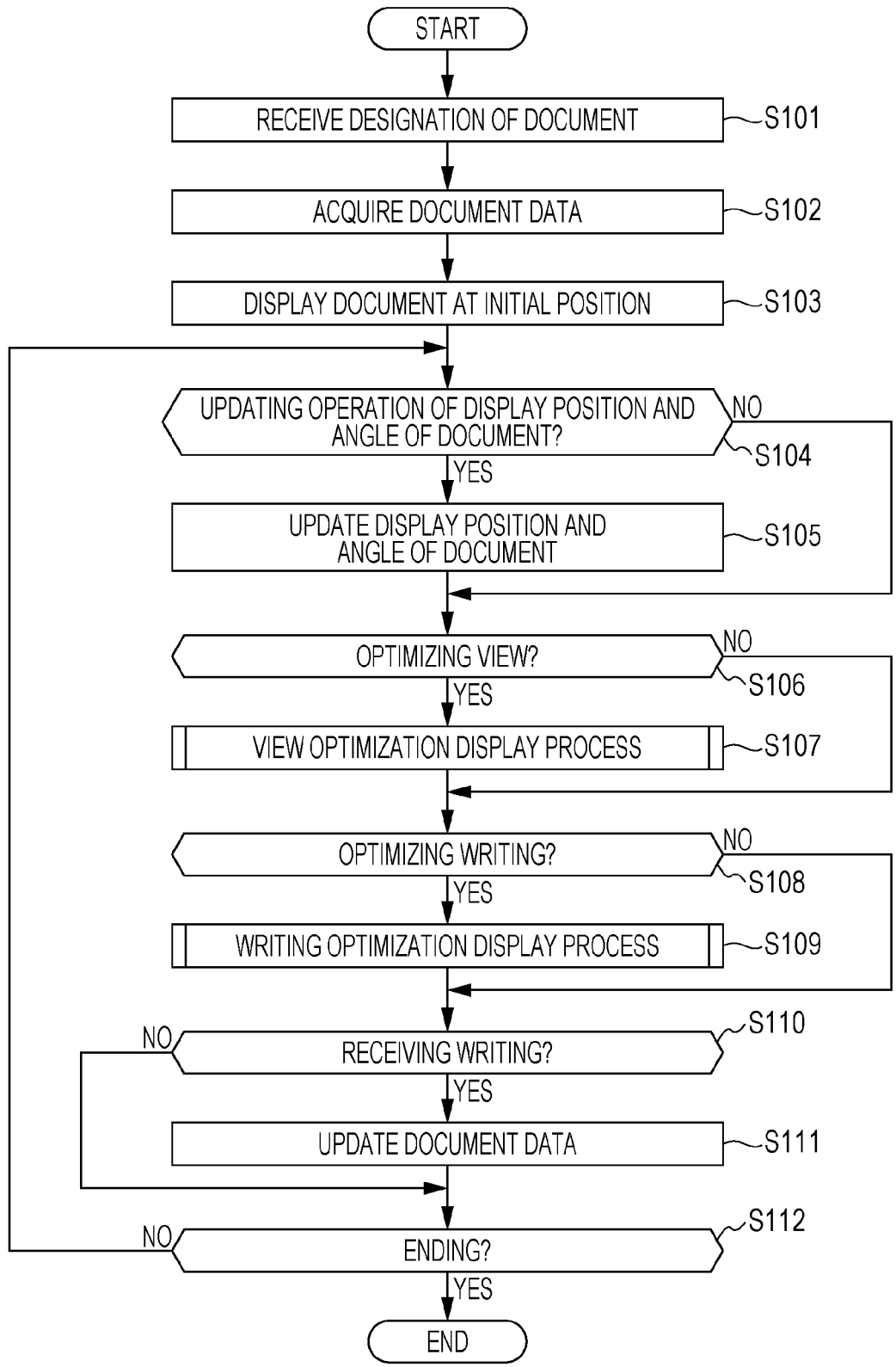
FIG. 16 is a flowchart illustrating the entire flow of the document display control process.

Upon receiving a designation of a document to be displayed on the display 14 from the user as illustrated in FIG. 16 (S101), the document display apparatus 10 reads and acquires the data of the designated document from the document information memory 28 (S102).

The document display apparatus 10 displays the document acquired in step S102 at an initial position on the display 14 (S103). The initial position may be a predetermined position or a previous display position of the document.

Upon receiving, from the input unit 15, an update operation in the display position and angle of the document (yes branch from S104), the document display apparatus 10 performs the control process of the document by updating the display position and display angle of the document displayed on the display 14 in response to the update operation (S105). If the update operation in the display position and angle of the document is not received (not branch from S104), processing proceeds to steps S106 with S105 skipped.

Upon receiving an operation for the view optimization of the document from the input unit 15 (yes branch from S106), the document display apparatus 10 performs the view optimization process of the document (S107). The view optimization process of the document is described in detail below. If the operation for the view optimization process has not been received (no branch from S106), the document display apparatus 10 proceeds to steps S108 with S107 skipped.

The document display apparatus 10 performs a writing optimization process of the document (S109) if the document display apparatus 10 detects that a writing job is to be performed on the document displayed on the display 14 and determines that the writing optimization process is to be performed on the document (yes branch from S108). The writing optimization process is described in detail below. If the document display apparatus 10 determines that the writing display optimization process is not to be performed (no branch from S108), the document display apparatus 10 proceeds to step S110.

Upon receiving a writing operation on the document displayed on the display 14 from the input unit 15 (yes from S110), the document display apparatus 10 updates the data of the document in response to the received writing operation (S111). If the document display apparatus 10 has not received the writing operation on the document displayed on the display 14 (no branch from S110) and the display control process is not to be ended (no branch from S112), processing returns to step S104. If the display control process of the document is to be ended (yes from S112), the document display apparatus 10 closes the document data and ends the process.

The view optimization process of the document in step S107 is described in detail with reference to FIG. 17.

Figure 17:
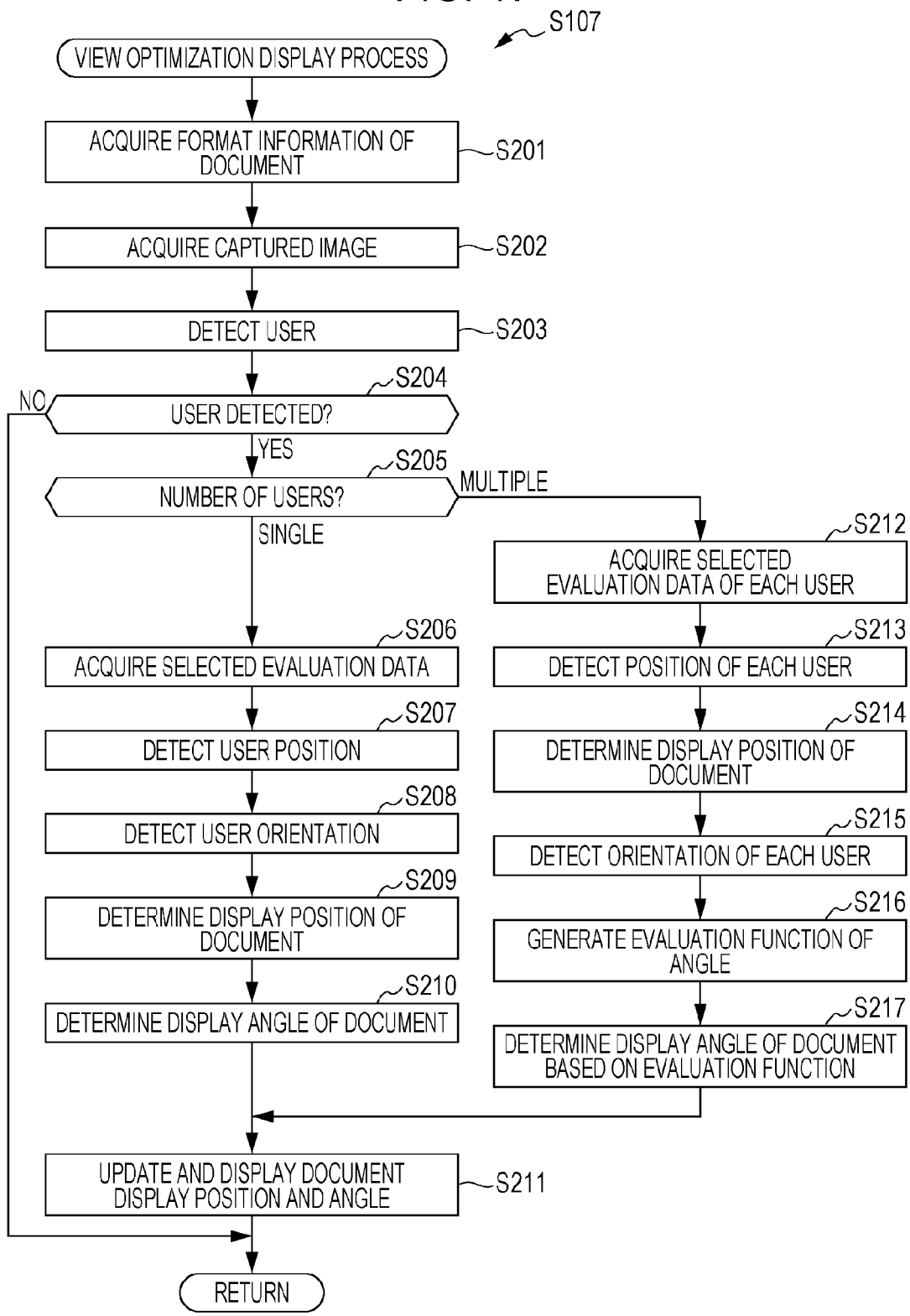
FIG. 17 is a flowchart illustrating a view optimization display process.

As illustrated in FIG. 17, the document display apparatus 10 acquires the format information of the document related to the display control process (S201). The format information may include information indicating whether the document is vertically written or horizontally written.

The document display apparatus 10 acquires the captured image of the document display apparatus 10 and the surrounding area thereof (S202), and detects a user from the captured image (S203).

If no user is detected in step S203 (no branch from S204), the document display apparatus 10 returns to the initial step (S201). If a user is detected in step S203 (yes branch from S204), the document display apparatus 10 proceeds to step S205.

If the number of users detected in step S203 is one ("single" branch from S205), the document display apparatus 10 acquires from the evaluation data memory 29 the job of the user (reading job), the format information acquired in step S201, and the evaluation data selected based on the information related to the dominant hand of the user (S206).

The document display apparatus 10 detects the position of the user detected in step S203 based on the captured image acquired in step S202 (S207), and detects the orientation of the user (S208). The document display apparatus 10 determines the display position of the document based on the position and orientation of the user respectively detected in steps S207 and S208 (and further based on the information related to the dominant hand of the user) (S209).

The document display apparatus 10 determines the display angle of the document based on an optimum value of angle made between the orientation of the user (direction vector) and the orientation of the document (direction vector) with respect to the evaluation data acquired in step S206, and the orientation of the user detected in step S208 (S210).

The document display apparatus 10 updates the image of the document displayed on the display 14 based on the display position of the document determined in step S209, and the display angle of the document determined in step S210 (S211), and then returns to the initial step (S201).

If the number of users detected in step S203 is plural in step S205 (yes branch from S205), the document display apparatus 10 acquires from the evaluation data memory 29 the evaluation data of each user based on the job of each user (reading job), the format information acquired in step S201, and the information related to the dominant hand of each user (S212).

The document display apparatus 10 detects the position of each of the multiple users detected in step S203 based on the captured image acquired in step S202 (S213), and determines the display position of the document based on the detected position of each of the multiple users (S214).

The document display apparatus 10 determines the orientation of each of the users (direction vector) detected in step S203 (S215), generates the evaluation function of the display angle of the document based on the evaluation data of each user acquired in step S212, and the orientation of each user (S216), and determines the display angle of the document based on the generated evaluation function (S217).

The document display apparatus 10 updates the image of the document displayed on the display 14 based on the display position of the document determined in step S214 and the display angle of the document determined in step S217 (S211), and then returns to the initial step (S201).

The writing optimization display process of the document in step S109 is described in detail with reference to FIG. 18.

Figure 18:
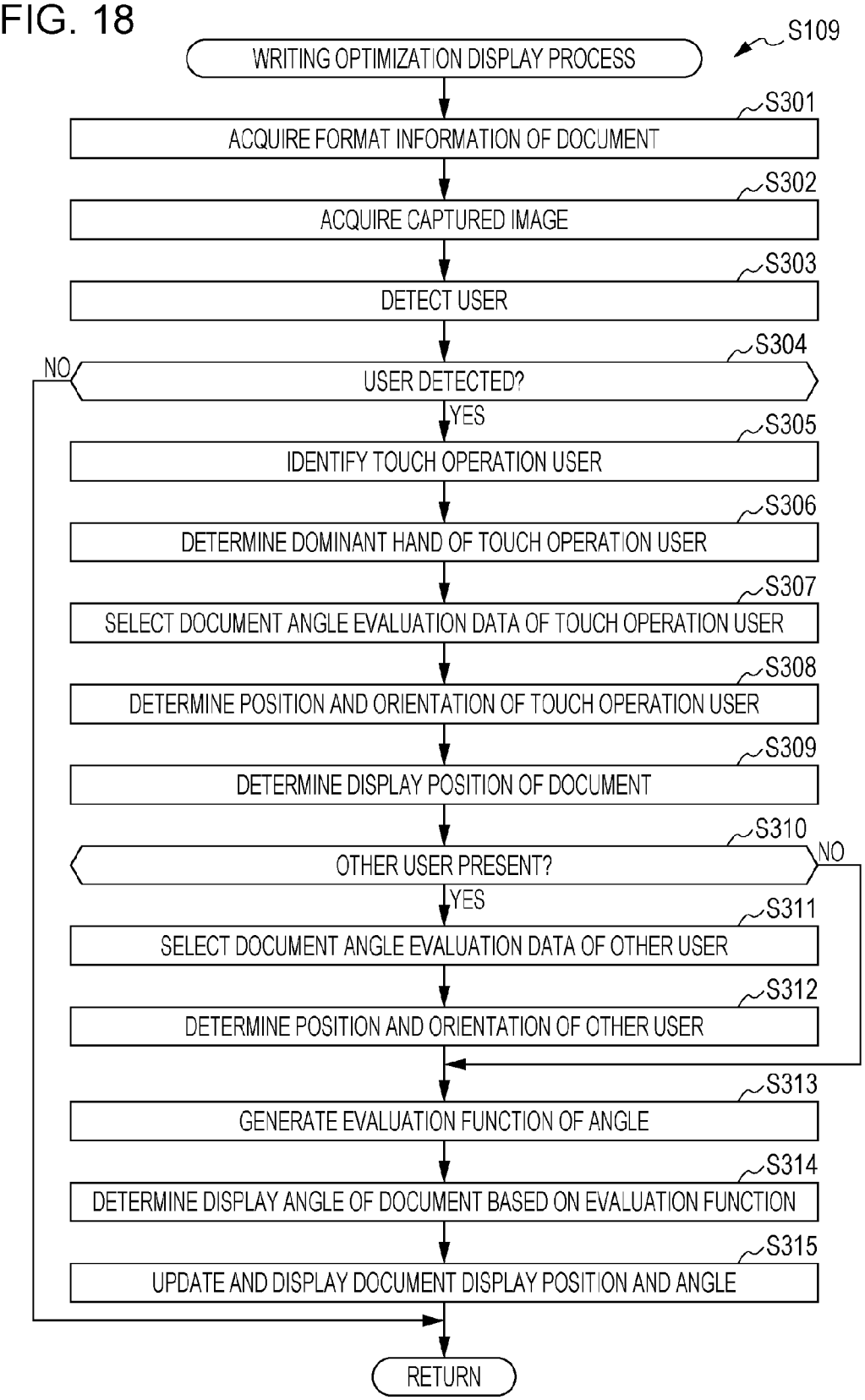
FIG. 18 is a flowchart illustrating a writing (job) optimization display process.

Referring to FIG. 18, the document display apparatus 10 acquires the format information of the document related to the display control process (S301). The format information may include information indicating whether the document is vertically written or horizontally written.

The document display apparatus 10 acquires from the camera C the captured image of the document display apparatus 10 and the surrounding area thereof (S302), and detects a user from the captured image (S303).

If no user is detected in step S303 (no branch from S304), the document display apparatus 10 returns to the initial step (S301). If a user is detected in step S303 (yes branch from S304), the document display apparatus 10 proceeds to step S305.

The document display apparatus 10 identifies a writing user from among the users detected in step S303 (S305), and acquires the information related to the dominant hand of the writing user (S306). For example, the document display apparatus 10 identifies as a writing user a user who holds a touchpen P, and acquires the information related to the dominant hand of the writing user based on whether the hand holding the touchpen P is the right hand or left hand.

The document display apparatus 10 acquires from the evaluation data memory 29 the job of the writing user (writing job), the format information acquired in step S301, and the evaluation data selected based on the information related to the dominant hand of the writing user (S307).

The document display apparatus 10 determines the position and orientation of the writing user detected in step S305 based on the captured image acquired in step S302 (S308). The document display apparatus 10 then determines the display position of the document based on the determined position and orientation, and the information related to the dominant hand of the writing user (S309).

If another user in addition to the writing user detected in step S306 is present among users detected in step S303 (yes branch from S310), the document display apparatus 10 acquires the evaluation data of each of the other users from the evaluation data memory 29 based on the job of the other user (reading job), the format information acquired in step S301, and the dominant hand information of the other users (S311).

The document display apparatus 10 determines the position and orientation of each of the other users based on the captured image acquired in step S302 (S312).

The document display apparatus 10 generates the evaluation function of the display angle of the document based on the orientation of the writing user determined in step S308 (direction vector), the orientation of each of the other users determined in step S312 (direction vector), and the evaluation data acquired for each user (S313). If no user other than the writing user is present in step S310, the document display apparatus 10 generates the evaluation function of the display angle of the document based on the orientation of the writing user determined in step S308 (direction vector), and the evaluation data acquired for the writing user (S313)

The document display apparatus 10 determines the display angle of the document based on the evaluation function generated in step S313 (S314), updates the image of the document to be displayed on the display 14 based on the display position of the document determined in step S309, and the display angle of the document determined in step S314 (S315), and returns to the initial step (S301).

The present invention is not limited to the exemplary embodiment described above. For example, the user may enter the dominant hand information together with the user ID when the user starts using the system so that the dominant hand information may be acquired later. If the touchpen P has a communication function, the shifting to the write mode may be detected when the pressing of a button on the touchpen P is notified to the document display apparatus 10. If the touchpen P has a user finger print reading function, the finger print information may be transmitted to the document display apparatus 10 to start the write mode. Furthermore, the ID of a user who performs the writing job may be identified using the finger print information.

In the exemplary embodiment, the document is displayed on the display 14. The present invention may be applicable to an application where a document image is projected onto a table using a projector, or to a device that displays a video in the air without using a physical display. In the exemplary embodiment, the image of the document displayed on the display is rotated. Alternatively, the display displaying the image of the document may be rotated instead of rotating the image of the document. An angle of rotation for the display in such a case (the angle is with respect to the y axis and the x and y axes are not rotated) is identical to the display angle θ described above.

In the exemplary embodiment, the display 14, the document display controller 30 controlling the display 14, and the document information memory 28 are incorporated into the single apparatus. Alternatively, these elements may be separately arranged in apparatuses thereof.

In the exemplary embodiment, the position of the document is updated in accordance with the position of the user. Alternatively, only the angle of the document may be changed with the position of the document unchanged.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control apparatus comprising:
at least one processor configured to execute:
an acquisition unit that acquires a document to be displayed on a display;
a detector that detects at least one user present in a surrounding area of the display; and
a display controller configured to control a display angle of the document using an orientation of the at least one user with respect to the document displayed on the display,
wherein the display controller is configured to control the display angle of the document to change in response to the orientation of the at least one user with respect to the document displayed on the display being changed, even though a position of the at least one user with respect to the document displayed on the display is not changed,
wherein the display controller is configured to control the display angle of the document to change depending on whether the at least one user is reading the document displayed on the display or writing on the document displayed on the display, even though the orientation of the at least one user with respect to the document displayed on the display is not changed,
wherein the display controller is configured to control the display angle of the document to change in response to determining that the at least one user is reading the document displayed on the display or writing on the document displayed on the display, even though the orientation of the at least one user with respect to the document displayed on the display is not changed,
wherein the at least one processor is further configured to execute a job determination unit that determines one of a plurality of jobs, including a reading job and a writing job, performed by each of the at least one user on the document displayed on the display, and
wherein the display controller controls the display angle of the document, using evaluation data and the orientation of the at least one user with respect to the document, the evaluation data evaluating an angle made between the document and the user and determined using the job determined by the job determination unit for each of the at least one user.

2. The display control apparatus according to claim 1, wherein the at least one processor is further configured to execute a dominant hand information acquisition unit that acquires information related to a dominant hand of each of the at least one user, and
wherein the display controller controls the display angle of the document, using evaluation data and the orientation of the at least one user with respect to the document, the evaluation data evaluating an angle made between the document and the user and determined using the job and the dominant hand determined for each of the at least one user.

3. The display control apparatus according to claim 2, wherein the at least one processor is further configured to execute a display position determination unit configured to determine a display position of the document on the display using a job of each of the at least one user and a position of each of the at least one user.

4. The display control apparatus according to claim 1, wherein the at least one processor is further configured to execute a display position determination unit configured to determine a display position of the document on the display using a job of each of the at least one user and a position of each of the at least one user.

5. The display control apparatus according to claim 4, wherein if a plurality of users is present in the surrounding area of the display and an operation user who performs a job on the display is present among the plurality of users, the display position determination unit determines the display position of the document using a position of the operation user, and an orientation of the operation user with respect to the document, and
wherein the display controller controls the display angle of the document so that an angle made between the operation user and the document displayed at the display position falls within a predetermined range of angle.

6. The display control apparatus according to claim 1, wherein if a plurality of users is present in the surrounding area of the display and an operation user who performs a job on the display is not among the plurality of users, the display controller controls the display angle of the document using the display position of the document displayed on the display and a position of each of the users so that an angle made between at least one of the users and the document displayed at the display position falls within a predetermined range of angle.

7. The display control apparatus according to claim 1, wherein the at least one processor is further configured to execute a first determination unit configured to determine the orientation of the at least one user with respect to the document using the display position of the document displayed on the display and a position of the at least one user.

8. The display control apparatus according to claim 1, wherein the at least one processor is further configured to execute:
a captured image acquisition unit that acquires an image captured by imaging the at least one user; and
a second determination unit configured to determine the orientation of the at least one user using a shape of an image region of the at least one user imaged in the captured image.

9. A display control method comprising:
acquiring a document to be displayed on a display;
detecting at least one user present in a surrounding area of the display;
controlling a display angle of the document using an orientation of the at least one user with respect to the document displayed on the display;
controlling the display angle of the document to change in response to the orientation of the at least one user with respect to the document displayed on the display being changed, even though a position of the at least one user with respect to the document displayed on the display is not changed;
controlling the display angle of the document to change depending on whether the at least one user is reading the document displayed on the display or writing on the document displayed on the display, even though the orientation of the at least one user with respect to the document displayed on the display is not changed;
controlling the display angle of the document to change in response to determining that the at least one user is reading the document displayed on the display or writing on the document displayed on the display, even though the orientation of the at least one user with respect to the document displayed on the display is not changed;
executing a job determination unit that determines one of a plurality of jobs, including a reading job and a writing job, performed by each of the at least one user on the document displayed on the display; and
controlling the display angle of the document, using evaluation data and the orientation of the at least one user with respect to the document, the evaluation data evaluating an angle made between the document and the user and determined using the job determined by the job determination unit for each of the at least one user.

10. A non-transitory computer readable medium storing a program causing a computer to execute a process for controlling a display, the process comprising:
acquiring a document to be displayed on a display;
detecting at least one user present in a surrounding area of the display;
controlling a display angle of the document using an orientation of the at least one user with respect to the document displayed on the display;
controlling the display angle of the document to change in response to the orientation of the at least one user with respect to the document displayed on the display being changed, even though a position of the at least one user with respect to the document displayed on the display is not changed;
controlling the display angle of the document to change depending on whether the at least one user is reading the document displayed on the display or writing on the document displayed on the display, even though the orientation of the at least one user with respect to the document displayed on the display is not changed;
controlling the display angle of the document to change in response to determining that the at least one user is reading the document displayed on the display or writing on the document displayed on the display, even though the orientation of the at least one user with respect to the document displayed on the display is not changed;
executing a job determination unit that determines one of a plurality of jobs, including a reading job and a writing job, performed by each of the at least one user on the document displayed on the display; and controlling the display angle of the document, using evaluation data and the orientation of the at least one user with respect to the document, the evaluation data evaluating an angle made between the document and the user and determined using the job determined by the job determination unit for each of the at least one user.

11. A display control apparatus comprising:
at least one processor configured to execute:
   an acquisition unit that acquires a document to be displayed on a display;
   a detector that detects at least one user present in a surrounding area of the display; and
   a display controller configured to control a display angle of the document using an orientation of the at least one user with respect to the document displayed on the display,
wherein the display controller is configured to control a display position of the document displayed on the display to change using the orientation of the at least one user with respect to the document displayed on the display,
wherein the display controller is configured to control the display angle of the document to change depending on whether the at least one user is reading the document displayed on the display or writing on the document displayed on the display, even though the orientation of the at least one user with respect to the document displayed on the display is not changed,
wherein the display controller is configured to control the display angle of the document to change in response to determining that the at least one user is reading the document displayed on the display or writing on the document displayed on the display, even though the orientation of the at least one user with respect to the document displayed on the display is not changed,
wherein the at least one processor is further configured to execute a job determination unit that determines one of a plurality of jobs, including a reading job and a writing job, performed by each of the at least one user on the document displayed on the display, and
wherein the display controller controls the display angle of the document, using evaluation data and the orientation of the at least one user with respect to the document, the evaluation data evaluating an angle made between the document and the user and determined using the job determined by the job determination unit for each of the at least one user.

12. A display control apparatus comprising:
at least one processor configured to execute:
   an acquisition unit that acquires a document to be displayed on a display;
   a detector that detects at least one user present in a surrounding area of the display;
   a display controller configured to control a display angle of the document using an orientation of the at least one user with respect to the document displayed on the display; and
   a display position determination unit configured to determine a display position of the document on the display,
wherein the display position determination unit and the display controller are configured such that, in response to a single user being present in the surrounding area of the display, the display position determination unit determines the display position of the document using the position of the single user and the orientation of the single user with respect to the document and the display controller controls the display to display only the document,
wherein the display controller is configured to control the display angle of the document to change depending on whether the at least one user is reading the document displayed on the display or writing on the document displayed on the display, even though the orientation of the at least one user with respect to the document displayed on the display is not changed,
wherein the display controller is configured to control the display angle of the document to change in response to determining that the at least one user is reading the document displayed on the display or writing on the document displayed on the display, even though the orientation of the at least one user with respect to the document displayed on the display is not changed,
wherein the at least one processor is further configured to execute a job determination unit that determines one of a plurality of jobs, including a reading job and a writing job, performed by each of the at least one user on the document displayed on the display, and
wherein the display controller controls the display angle of the document, using evaluation data and the orientation of the at least one user with respect to the document, the evaluation data evaluating an angle made between the document and the user and determined using the job determined by the job determination unit for each of the at least one user.

13. A display control apparatus comprising:
at least one processor configured to execute:
   an acquisition unit that acquires a document to be displayed on a display;
   a detector that detects at least one user present in a surrounding area of the display; and
   a display controller configured to control a display angle of the document using an orientation of the at least one user with respect to the document displayed on the display,
wherein the display controller is configured to control the display angle of the document to change in response to the orientation of the at least one user with respect to the document displayed on the display being changed, even though a position of the at least one user with respect to the document displayed on the display is not changed,
wherein the display controller is configured to control the display angle of the document to change depending on whether the at least one user is reading the document displayed on the display or writing on the document displayed on the display, even though the orientation of the at least one user with respect to the document displayed on the display is not changed,
wherein the display controller is configured to control the display angle of the document to change in response to determining that the at least one user is reading the document displayed on the display or writing on the document displayed on the display, even though the orientation of the at least one user with respect to the document displayed on the display is not changed,
wherein the display controller is configured to control the display angle of the document to change in response to determining that the at least one user is reading the document displayed on the display, even though the orientation of the at least one user with respect to the document displayed on the display is not changed, and wherein the display controller is configured to control the display angle of the document to change in response to determining that the at least one user is writing on the document displayed on the display, even though the orientation of the at least one user with respect to the document displayed on the display is not changed.

* * * * *